United States Patent
Frodyma et al.

(10) Patent No.: US 12,459,875 B2
(45) Date of Patent: **\*Nov. 4, 2025**

(54) USE OF PHOSPHATE-SOLUBILIZING MICROORGANISMS AND LIPO-CHITOOLIGOSACCHARIDES FOR ENHANCING PLANT GROWTH

(71) Applicant: NOVOZYMES BIOAG A/S, Bagsvaerd (DK)

(72) Inventors: Michael Frodyma, St. Louis, MO (US); Shawn Semones, St. Louis, MO (US); R. Stewart Smith, Pewaukee, WI (US); Yaowei Kang, Christiansburg, VA (US)

(73) Assignee: NOVOZYMES BIOAG A/S, Bagsvaerd (DK)

( * ) Notice: Subject to any disclaimer, the term of this patent is extended or adjusted under 35 U.S.C. 154(b) by 0 days.

This patent is subject to a terminal disclaimer.

(21) Appl. No.: 18/646,827

(22) Filed: Apr. 26, 2024

(65) Prior Publication Data

US 2024/0300868 A1    Sep. 12, 2024

Related U.S. Application Data

(63) Continuation of application No. 14/345,057, filed as application No. PCT/US2012/055435 on Sep. 14, 2012, now Pat. No. 11,999,666.

(60) Provisional application No. 61/534,639, filed on Sep. 14, 2011.

(51) Int. Cl.
  C05F 11/08    (2006.01)
  A01N 43/16    (2006.01)
  A01N 63/36    (2020.01)

(52) U.S. Cl.
  CPC ............. *C05F 11/08* (2013.01); *A01N 43/16* (2013.01); *A01N 63/36* (2020.01)

(58) Field of Classification Search
  None
  See application file for complete search history.

(56) References Cited

U.S. PATENT DOCUMENTS

| | | |
|---|---|---|
| 2,954,643 A | 10/1960 | Porter et al. |
| 4,536,207 A | 8/1985 | McCandliss et al. |
| 4,804,750 A | 2/1989 | Nishimura et al. |
| 4,812,159 A | 3/1989 | Freepons |
| 4,886,541 A | 12/1989 | Hadwiger |
| 4,940,840 A | 7/1990 | Suslow et al. |
| 4,964,894 A | 10/1990 | Freepons |
| 4,978,381 A | 12/1990 | Hadwiger |
| 5,026,417 A | 6/1991 | Kucey |
| 5,057,141 A | 10/1991 | Rodriquez-Kabana et al. |
| 5,104,437 A | 4/1992 | Hadwiger |
| 5,141,745 A | 8/1992 | Rolfe |
| 5,175,149 A | 12/1992 | Stacey et al. |
| 5,321,011 A | 6/1994 | Stacey et al. |
| 5,374,627 A | 12/1994 | Ito et al. |
| 5,454,464 A | 10/1995 | Yamamoto et al. |
| 5,484,464 A | 1/1996 | Gleddie et al. |
| 5,536,155 A | 7/1996 | Futaki et al. |
| 5,549,718 A | 8/1996 | Lerouge et al. |
| 5,554,445 A | 9/1996 | Struszczyk et al. |
| 5,586,411 A | 12/1996 | Gleddie et al. |
| 5,628,810 A | 5/1997 | Dugast et al. |
| 5,646,018 A | 7/1997 | Broughton et al. |
| 5,696,098 A | 12/1997 | Muraki |
| 5,702,752 A | 12/1997 | Gugger et al. |
| 5,705,634 A | 1/1998 | Bredehorst et al. |
| 5,720,793 A | 2/1998 | Kato et al. |
| 5,726,123 A | 3/1998 | Heinsohn et al. |
| 5,733,851 A | 3/1998 | Villanueva et al. |
| 5,830,459 A | 11/1998 | Cuero et al. |
| 5,922,316 A | 7/1999 | Smith et al. |
| 5,965,545 A | 10/1999 | Ben-Shalom et al. |
| 5,990,291 A | 11/1999 | Waggle et al. |
| 6,060,429 A | 5/2000 | Ben-Shalom et al. |
| 6,133,196 A | 10/2000 | Ocamb et al. |
| 6,146,668 A | 11/2000 | Kelly et al. |
| 6,167,652 B1 | 1/2001 | Heinsohn et al. |
| 6,193,988 B1 | 2/2001 | Stoner, II et al. |
| 6,197,942 B1 | 3/2001 | Muraki |
| 6,200,929 B1 | 3/2001 | Horibe et al. |
| 6,242,381 B1 | 6/2001 | Van der Krieken et al. |
| 6,258,749 B1 | 7/2001 | Nonomura |
| 6,306,835 B1 | 10/2001 | Daly et al. |
| 6,352,727 B1 | 3/2002 | Takahashi |
| 6,407,040 B1 | 6/2002 | Nichols |
| 6,413,910 B1 | 7/2002 | Vasiljevich et al. |
| 6,524,998 B1 | 2/2003 | Kloepper et al. |
| 6,589,352 B1 | 7/2003 | Yudovsky et al. |

(Continued)

FOREIGN PATENT DOCUMENTS

| | | |
|---|---|---|
| CA | 2202024 A1 | 10/1998 |
| CN | 1093904 A | 10/1994 |

(Continued)

OTHER PUBLICATIONS

Aam et al., 2010, Marine Drugs, 8, 1482-1517.
Asta, 2011, 40.
Asta, 2012, 45.
Cas Dalian Chem&Physical Inst, 2008, Abstract of CN101543230A.
Cho et al., 2008, Journal of Food Science, 73(1), S70-S77.
Claude Pierre Philippe, 2010, Abstract of FR2941591A1.
Collinge et al., 1993, Plant Journal, 3(1), 31-40.

(Continued)

*Primary Examiner* — Alton N Pryor

(74) *Attorney, Agent, or Firm* — Adam Rucker

(57) ABSTRACT

Methods for enhancing the growth and/or yield of plants, such as corn and wheat, through the application of one or more phosphate-solubilizing microorganisms and one or more lipo-chitooligosaccharides and/or chitooligosaccharides to plant seeds prior to planting.

18 Claims, 2 Drawing Sheets

(56) References Cited

U.S. PATENT DOCUMENTS

| | | |
|---|---|---|
| 6,589,942 B1 | 7/2003 | Ben-Shalom et al. |
| 6,630,459 B2 | 10/2003 | Vournakis et al. |
| 6,649,566 B2 | 11/2003 | Doostdar |
| 6,849,576 B2 | 2/2005 | Suzuki et al. |
| 6,878,819 B1 | 4/2005 | Natunen |
| 6,933,380 B2 | 8/2005 | Huang et al. |
| 6,979,664 B1 | 12/2005 | Smith et al. |
| 7,098,324 B2 | 8/2006 | Haigler et al. |
| 7,205,450 B2 | 4/2007 | Cook et al. |
| 7,250,068 B1 | 7/2007 | Smith et al. |
| 7,262,151 B2 | 8/2007 | Smith et al. |
| 7,485,718 B2 | 2/2009 | Sabesan |
| 7,521,212 B1 | 4/2009 | Samain et al. |
| 7,576,213 B2 | 8/2009 | Flematti et al. |
| 7,619,076 B2 | 11/2009 | Beau et al. |
| 7,637,980 B2 | 12/2009 | Smith et al. |
| 7,670,820 B2 | 3/2010 | Shaw et al. |
| 8,008,544 B2 | 8/2011 | De Block et al. |
| 8,357,631 B2 | 1/2013 | Smith et al. |
| 8,946,119 B2 | 2/2015 | Smith et al. |
| 8,992,653 B2 | 3/2015 | Smith et al. |
| 9,055,746 B2 | 6/2015 | Smith et al. |
| 9,055,747 B2 | 6/2015 | Smith et al. |
| 2002/0000540 A1 | 1/2002 | Smither-Kopperl |
| 2002/0076402 A1 | 6/2002 | Khouri et al. |
| 2003/0028918 A1 | 2/2003 | Wei |
| 2003/0096375 A1 | 5/2003 | Smith et al. |
| 2005/0187107 A1 | 8/2005 | Smith et al. |
| 2006/0277632 A1 | 12/2006 | Carr et al. |
| 2007/0027032 A1 | 2/2007 | Chen et al. |
| 2007/0105815 A1 | 5/2007 | Vournakis et al. |
| 2007/0234172 A1 | 10/2007 | Chiabrera |
| 2007/0238872 A1 | 10/2007 | Sabesan |
| 2008/0057093 A1 | 3/2008 | Wan et al. |
| 2008/0072494 A1 | 3/2008 | Stoner et al. |
| 2008/0172763 A1 | 7/2008 | Jensen et al. |
| 2008/0248953 A1 | 10/2008 | Smith et al. |
| 2008/0269055 A1 | 10/2008 | Bastiaans et al. |
| 2009/0105077 A1 | 4/2009 | Bhatti et al. |
| 2009/0305895 A1 | 12/2009 | McIver et al. |
| 2010/0031388 A1 | 2/2010 | Tirichine et al. |
| 2010/0048404 A1 | 2/2010 | Hungenberg et al. |
| 2010/0087369 A1 | 4/2010 | Cutsem et al. |
| 2010/0093537 A1 | 4/2010 | Smith et al. |
| 2010/0099560 A1 | 4/2010 | Hnatowich et al. |
| 2010/0113278 A1 | 5/2010 | Suty-Heinze et al. |
| 2010/0260735 A1 | 10/2010 | Bais et al. |
| 2011/0301032 A1 | 12/2011 | Denarie et al. |
| 2012/0077674 A1 | 3/2012 | Cargeeg et al. |
| 2012/0252672 A1 | 10/2012 | Kang et al. |
| 2012/0322659 A1 | 12/2012 | Smith et al. |
| 2013/0061645 A1 | 3/2013 | Smith et al. |
| 2013/0109567 A1 | 5/2013 | Smith et al. |
| 2014/0342904 A1 | 11/2014 | Frodyma et al. |

FOREIGN PATENT DOCUMENTS

| | | |
|---|---|---|
| CN | 1142833 A | 2/1997 |
| CN | 1470168 A | 1/2004 |
| CN | 101092315 A | 12/2007 |
| CN | 101115390 A | 1/2008 |
| CN | 101248797 A | 8/2008 |
| CN | 101543230 A | 9/2009 |
| CN | 101578044 A | 11/2009 |
| CN | 101601410 A | 12/2009 |
| CN | 101818181 A | 9/2010 |
| CN | 102283201 A | 12/2011 |
| DE | 6990493.9 | 1/2003 |
| EP | 1098567 B1 | 1/2003 |
| FR | 2941591 A1 | 8/2010 |
| JP | H083010 A | 1/1996 |
| JP | 2001507361 A | 6/2001 |
| RU | 2356226 C2 | 5/2009 |
| WO | 1989007395 A1 | 8/1989 |
| WO | 1992017591 A1 | 10/1992 |
| WO | 1994011006 A1 | 5/1994 |
| WO | 1995015343 A1 | 6/1995 |
| WO | 1997026363 A2 | 7/1997 |
| WO | 1998032335 A1 | 7/1998 |
| WO | 1998034464 A2 | 8/1998 |
| WO | 2000004778 A1 | 2/2000 |
| WO | 2001026465 A1 | 4/2001 |
| WO | 2003026677 A1 | 4/2003 |
| WO | 2003077654 A1 | 9/2003 |
| WO | 2004093542 A1 | 11/2004 |
| WO | 2005062899 A2 | 7/2005 |
| WO | 2005063784 A1 | 7/2005 |
| WO | 2005087005 A1 | 9/2005 |
| WO | 2006102717 A1 | 10/2006 |
| WO | 2007006318 A2 | 1/2007 |
| WO | 2008085958 A1 | 7/2008 |
| WO | 2009049747 A2 | 4/2009 |
| WO | 2010037167 A1 | 4/2010 |
| WO | 2010049751 A1 | 5/2010 |
| WO | 2010125065 A2 | 11/2010 |
| WO | 2012120105 A1 | 9/2012 |

OTHER PUBLICATIONS

Cote et al., 1994, Plant Molecular Biology, 26, 1379-1411.
Cote et al., 1995, Physiologia Plantarum, 93, 401-410.
Cottaz et al., 2005, Metabolic Engineering, 7, 311-317.
Croplan and Winfield United, 2017, 481-510.
Cytryn et al., 2007, Journal of Bacteriology, 189(19), 6751-6762.
D'Haeze et al., 2002, Glycobiology, 12, 6, 79R-105R.
Darvill et al., 1992, Glycobiology, 2(3), 181-198.
Deaker et al., 2007, Soil Biology & Biochemistry, 39, 573-580.
Demont-Caulet et al., 1999, Plant Physiology, 120, 83-92.
Denarie et al., 1996, Annual Reviews Biochem, 65, 503-535.
Diaz et al., 2000, Molecular Plant-Microbe Interactions, 13, 3, 268-276.
Dumon et al., 2006, ChemBioChem, 7, 359-365.
Engineering East China University, 2004, Abstract of CN1470168.
Ferguson et al., 2003, Journal of Plant Growth Regulation, 22, 47-72.
Flematti et al., 2010, Journal of Agricultural and Food Chemistry, 58, 8612-8617.
Friesen et al., 2005, Appl Microbiol Biotechnol, 68, 397-404.
Halford, 2010, Chemical & Engineering News, 88(15), 37-38.
Hamel et al., 2010, Planta, 232, 787-806.
Hamid et al., 2013, Journal of Pharmacy & Bioallied Sciences, 5(1), 21-29.
Heng et al., 2016, Frontiers in Plant Science, 7, 522.
Hungria et al., 1997, Soil Biol. Biochem., 29(5-6), 819-830.
Inoue Tadamoro et al., 1996, Abstract of JPH083010A.
Jiang et al., 2017, Marine drugs, 15(332), 1-14.
Jung et al., 2007, Carbohydrate Polymers, 67, 256-259.
Kananont et al., 2010, Scientia Horticulturae, 124, 239-247.
Kasprzewska et al., 2003, Cellular & Molecular Biology Letters, 8, 809-824.
Khan et al., 2002, Photosynthetica, 40(4), 621-624.
Kim et al., 2013, Carbohydrate Research, 372, 23-29.
Larson Grain Co., 2014, Proper Product Placement, 16-17.
Leibovitch et al., 2001, J. Agronomy & Crop Science, 187, 281-292.
Leprince et al., 2010, Plant Science, 179, 554-564.
Limpanavech et al., 2008, Scientia Horticulturae, 116, 65-72.
Ma, 2001, Plant Physiology and Agriculture, 37(5), 475-478.
Mabood et al., 2006, Field Crops Research, 95, 412-419.
Macchiavelli et al., 2004, Journal of Experimental Botany, 55(408), 2635-2640.
Maillet et al., 2011, Nature, 469, 58-64.
Maj et al., 2009, J Chem Ecol, 35, 479-487.
Mary et al., 1994, Soil Biol. Biochem., 26(9), 1125-1132.
Meridian Seed, 2014, Pricing, 2.
Mourya et al., 2011, Polymer Science Ser. A, 53(7), 583-612.
Müller et al., 2000, Plant Physiology, 124, 733-739.
Nanjing Inst for Comprehensive Utilization of Wild Plants CFSMC et al., 2011, Abstract of CN102283201.
Newsmart Cos Group, 2013.

(56) References Cited

OTHER PUBLICATIONS

Nishizawa et al., 1999, Plant Molecular Biology, 39, 907-914.
Noreen et al., 2003, Functional Plant Biology, 30, 1219-1232.
Novozymes Bioag, 2012, JumpStart, Phosphate-solubilizing inoculant with LCO Promoter Technology.
Novozymes Bioag, 2013, Extended label, JumpStart.
Novozymes Bioag, 2013, Seed treatment product range for various crops.
Novozymes Bioag, 2013, Seed Treatment, 2.
Novozymes, 2013, Material Safety Data Sheet, JumpStart.
O'Callaghan et al., 2012, Agronomy New Zealand, 42, 149-154.
Okada et al., 2002, Plant Cell Physiol., 43(5), 505-512.
Pedersen, Iowa State University Extension, Soybean Growth and Development, 1-27.
Pochanavanich et al., 2002, Letters in Applied Microbiology, 35, 17-21.
Prithiviraj et al., 2003, Planta, 216, 437-445.
Prome et al., 1998, Pure & Appl. Chem., 70(1), 55-60.
Radwan et al., 2007, International Journal of Phytoremediation, 9, 475-486.
Ralston et al., 2005, Plant Physiology, 137, 1375-1388.
Ramonell et al., 2005, Plant Physiology, 138, 1027-1036.
Robina et al., 2002, Tetrahedron, 58, 521-530.
Samain et al., 1997, Carbohydrate Research, 302, 35-42.
Samain et al., 1999, Journal of Biotechnology, 72, 33-47.
Schmidt et al., 1993, Plant Journal, 4(4), 651-658.
Shaw et al., 2006, Environmental Microbiology, 8(11),1867-1880.
Shen T, 2009, Abstract of CN101601410A.
Spaink, 2000, Annu. Rev. Micriobiol., 54, 257-288.
Staehelin et al., 1994, Proc. Natl. Acad. Sci. USA , 91, 2196-2200.
Streeter, 2003, Journal of Applied Microbiology, 95, 484-491.
Sugawara et al., 2010, Applied and Environmental Microbiology, 76(4), 1071-1081.
Supanjani et al., 2006, Plant Physiology and Biochemistry, 44, 866-872.
Szymanska et al., 2015, Marine Drugs, 13, 1819-1846.
Univ Jilin Agric., 2008, Abstract of CN101248797A.
Vander Holst et al., 2001, Current Opinion in Structural Biology, 11, 608-616.
Wakelin et al., 2004, Biol Fertil Soils, 40, 36-43.
Wan et al., 2008, The Plant Cell, 20, 471-481.
Xia et al., 2011, Food Hydrocolloids, 25, 170-179.
Yan H, 2007, Abstract of CN101092315A.
Yantai Lvyun Biochemical Co Ltd, 2010, Abstract of CN101818181.
Yoshikawa et al., 1993, Plant Cell Physiol., 34(8), 1163-1173.
Yuan et al., 2011, Journal of Anhui Agri. Sci., 39(1), 88-89.
Zahran, 2001, Journal of Biotechnology, 91, 143-153.
Zhang et al., 2002, Molecular Plant-Microbe Interactions, 15(9), 963-970.
Zhang et al., 2011, Fine Chemicals, 28(5), 479-483—incl. English abstract.
Zhu et al., 2005, Plant Foods for Human Nutrition, 60, 147-151.

USE OF PHOSPHATE-SOLUBILIZING MICROORGANISMS AND LIPO-CHITOOLIGOSACCHARIDES FOR ENHANCING PLANT GROWTH

CROSS-REFERENCE TO RELATED APPLICATIONS

The present application is a continuation of U.S. patent application Ser. No. 14/345,057, filed Apr. 10, 2014, which is a national stage entry of PCT/US2012/055435, filed Sep. 14, 2012, which claims priority to U.S. Provisional Patent Application No. 61/534,639, filed Sep. 14, 2011, the contents of each of which are fully incorporated herein by reference.

BACKGROUND

The symbiosis between the gram-negative soil bacteria, Rhizobiaceae and Bradyrhizobiaceae, and legumes such as soybean, is well documented. The biochemical basis for these relationships includes an exchange of molecular signaling, wherein the plant-to-bacteria signal compounds include flavones, isoflavones and flavanones, and the bacteria-to-plant signal compounds, which include the end products of the expression of the Bradyrhizobial and Rhizobial nod genes, known as lipo-chitooligosaccharides (LCOs). The symbiosis between these bacteria and the legumes enables the legume to fix atmospheric nitrogen for plant growth, thus obviating a need for nitrogen fertilizers. Since nitrogen fertilizers can significantly increase the cost of crops and are associated with a number of polluting effects, the agricultural industry continues its efforts to exploit this biological relationship and develop new agents and methods for improving plant yield without increasing the use of nitrogen-based fertilizers.

U.S. Pat. No. 6,979,664 teaches a method for enhancing seed germination or seedling emergence of a plant crop, comprising the steps of providing a composition that comprises an effective amount of at least one lipo-chitooligosaccharide and an agriculturally suitable carrier and applying the composition in the immediate vicinity of a seed or seedling in an effective amount for enhancing seed germination of seedling emergence in comparison to an untreated seed or seedling.

Further development on this concept is taught in WO 2005/062899, directed to combinations of at least one plant inducer, namely an LCO, in combination with a fungicide, insecticide, or combination thereof, to enhance a plant characteristic such as plant stand, growth, vigor and/or yield. The compositions and methods are taught to be applicable to both legumes and non-legumes, and may be used to treat a seed (just prior to planting), seedling, root or plant.

Similarly, WO 2008/085958 teaches compositions for enhancing plant growth and crop yield in both legumes and non-legumes, and which contain LCOs in combination with another active agent such as a chitin or chitosan, a flavonoid compound, or an herbicide, and which can be applied to seeds and/or plants concomitantly or sequentially. As in the case of the '899 Publication, the '958 Publication teaches treatment of seeds just prior to planting.

More recently, Halford, "Smoke Signals," in Chem. Eng. News (Apr. 12, 2010), at pages 37-38, reports that karrikins or butenolides which are contained in smoke act as growth stimulants and spur seed germination after a forest fire, and can invigorate seeds such as corn, tomatoes, lettuce and onions that had been stored. These molecules are the subject of U.S. Pat. No. 7,576,213.

In order to maintain healthy growth, plants must also extract a variety of elements from the soil in which they grow. These elements include phosphorus and the so-called micro-nutrients (e.g., copper, iron and zinc), but many soils are deficient in such elements or they contain them only in forms which cannot be readily taken up by plants (it is generally believed that essential elements cannot be readily taken up by plants unless they are present in dissolved form in the soil).

To counteract such deficiencies, sources of the deficient elements are commonly applied to soils in order to improve growth rates and yields obtained from crop plants. For example, phosphates are often added to soil to counteract a lack of available phosphorus. Phosphate added to the soil as a commercial fertilizer (e.g., mono-ammonium phosphate or triple-superphosphate) is readily plant available but is rapidly converted in soil to relatively unavailable forms. It has been estimated that only 10 to 30% of phosphate fertilizer is used by the plant in the year it is applied, and one-third to one-half of the phosphate fertilizer applied may never be recovered by the plant.

U.S. Pat. No. 5,026,417 describes an isolated strain of *Penicillium bilaiae* which is capable of improving the uptake of phosphorous by plants when applied to the soil.

There is, however, still a need for systems for improving or enhancing plant growth.

SUMMARY

A first aspect of the present invention is directed to a package, comprising a first container and a second container, wherein the first container comprises at least one phosphate solubilizing microorganism and a first agronomically acceptable carrier, and wherein the second container comprises at least one lipo-chitooligosaccharide (LCO) and/or at least one chitooligosaccharide (CO) and a second agronomically acceptable carrier, wherein the first and second agronomically acceptable carriers may be the same or different, and wherein the at least one phosphate solubilizing microorganism and the at least one LCO and/or at least one CO are each present in the first and second containers respectively, in an amount effective to enhance plant growth when applied to a plant or seed thereof as compared to an untreated plant or seed thereof. As used herein, the term "untreated" refers to seed or plants that are not treated with either active (i.e., the phosphate solubilizing microorganism, the LCO, or the CO).

Another aspect of the present invention is directed to a package, comprising a first container and a second container, wherein the first container comprises at least one phosphate solubilizing microorganism comprising a strain of the fungus *Penicillium* and a first agronomically acceptable carrier, and wherein the second container comprises at least one lipo-chito-oligosaccharide (LCO) and/or at least one chito-oligosaccharide (CO) and a second agronomically acceptable carrier, wherein the first and second agronomically acceptable carriers may be the same or different, and wherein the at least one phosphate solubilizing microorganism and the at least one LCO and/or at least one CO are each present in the first and second containers respectively, in an amount effective to enhance plant growth when applied to a plant or seed thereof as compared to an untreated plant or seed thereof.

Another aspect of the present invention is directed to an agronomical composition for treatment of a plant or seed thereof, comprising (a) at least one phosphate solubilizing microorganism and (b) at least one lipo-chitooligosaccharide (LCO) and/or at least one a chitooligosaccharide (CO), each present in an amount effective to enhance plant growth when applied to a plant or seed thereof as compared to an untreated plant or seed thereof.

A related aspect of the invention is directed to an agronomical composition for treatment of a plant or seed thereof, comprising (a) at least one phosphate solubilizing microorganism comprising a strain of the fungus *Penicillium*, and (b) at least one LCO and/or at least one CO, and (c) an agronomically acceptable carrier, wherein at least one phosphate solubilizing microorganism and the at least one LCO and/or at least one CO are each present in an amount effective to enhance plant growth when applied to a plant or seed thereof as compared to an untreated plant or seed thereof.

Another related aspect of the present invention is directed to plant seed treated with (e.g., having coated or disposed thereon) (a) at least one phosphate solubilizing microorganism, and (b) at least one LCO and/or at least one CO, each in an amount to enhance plant growth when applied to a the seed as compared to seed thereof. The phosphate solubilizing microorganism and the LCO and/or the CO may be applied to the seed via the same or different compositions. Packages containing the plant seed are also provided.

Another related aspect of the present invention is directed to plant seed treated with (e.g., having coated or disposed thereon) (a) at least one phosphate solubilizing microorganism comprising a strain of the fungus *Penicillium*, and (b) at least one LCO and/or at least one CO, each in an amount effective to enhance plant growth when applied to the seed compared to untreated seed. The phosphate solubilizing microorganism and the LCO and/or the CO may be applied to the seed via the same or different compositions. Packages containing the plant seed are also provided.

A further aspect of the present invention is directed to a method of enhancing plant growth, comprising a) treating (e.g., applying to) plant seed with an effective amount of at least one phosphate solubilizing microorganism, and b) treating the seed or treating (e.g., applying to) the plant that germinates from the seed with an effective amount of at least one LCO and/or at least one CO, wherein upon harvesting the plant exhibits at least one of increased plant yield measured in terms of bushels/acre, increased root number, increased root length, increased root mass, increased root volume and increased leaf area, compared to untreated plants or plants harvested from untreated seed.

A further aspect of the present invention is directed to a method of enhancing plant growth, comprising a) treating (e.g., applying to) plant seed with an effective amount of at least one phosphate solubilizing microorganism comprising a strain of the fungus *Penicillium*, and b) treating the seed or treating (e.g., applying to) the plant that germinates from the seed with an effective amount of at least one LCO and/or at least one CO, wherein upon harvesting the plant exhibits at least one of increased plant yield measured in terms of bushels/acre, increased root number, increased root length, increased root mass, increased root volume and increased leaf area, compared to untreated plants or plants harvested from untreated seed.

In some embodiments, treatment of the seed includes direct application of the at least one phosphate solubilizing microorganism and the at least one LCO and/or at least one CO (collectively "actives") onto the seed, which may then be planted or stored for a period of time prior to planting. Treatment of the seed may also include indirect treatment such as by introducing the actives into the soil (known in the art as in-furrow application). The actives may be used together in a single composition, or may be formulated in separate compositions for concomitant or sequential treatment. In yet other embodiments, the at least one LCO and/or at least one CO may be applied to the plant that germinates from the seed, and the at least one phosphate solubilizing microorganism is applied to the seed, directly or indirectly. In some embodiments, the seed are treated with one of the actives and then stored, and the other active is used to treat the seed at the time of planting. In yet other embodiments, the seed is treated with the at least one phosphate solubilizing microorganism and then stored, and the plant that germinates from the seed is treated with the at least one LCO and/or at least one CO. The compositions and methods may further include use of other plant signal molecules and/or other agronomically beneficial agents.

The method of the present invention is applicable to legumes and non-legumes alike. In some embodiments, the leguminous seed is soybean seed. In some other embodiments, the seed that is treated is non-leguminous seed such as a field crop seed, e.g., a cereal such as corn, or a vegetable crop seed such as potato.

DETAILED DESCRIPTION

Figure 1:
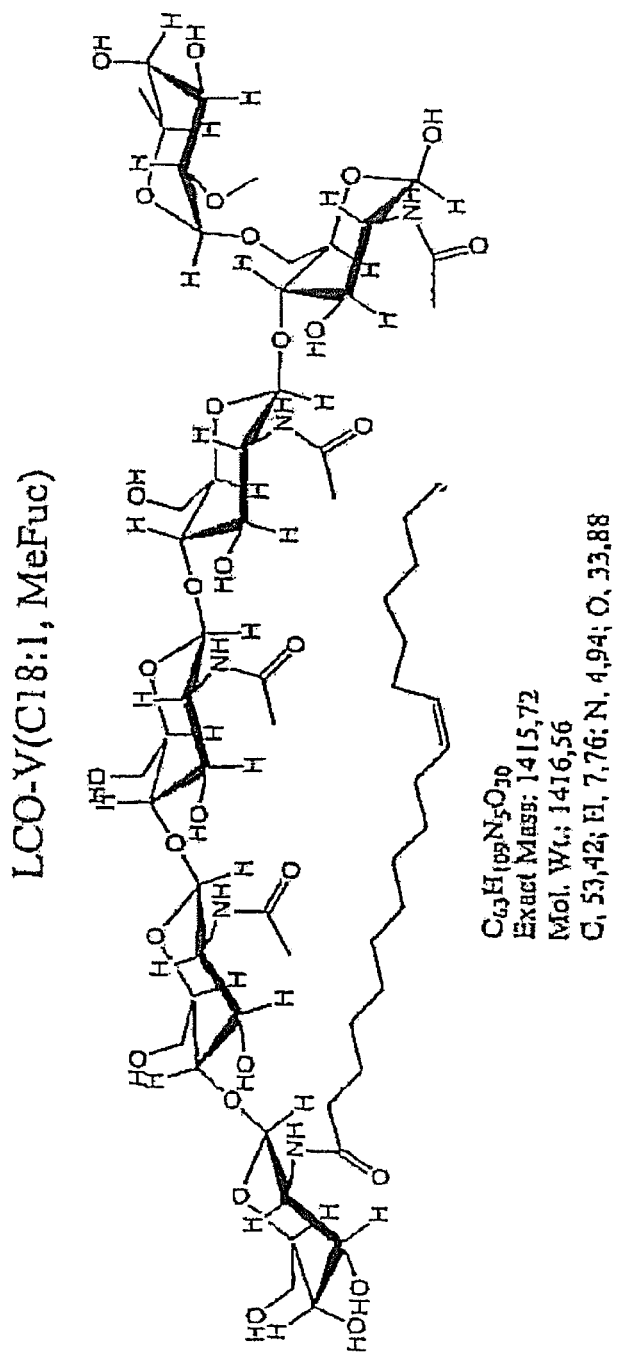
FIGS. 1 and 2 show the chemical structures of lipochitooligosaccharide compounds (LCO) useful in the practice of the present invention.

As used herein, "phosphate solubilizing microorganism" is a microorganism that is able to increase the amount of phosphorous available for a plant. Phosphate solubilizing microorganisms include fungal and bacterial strains. In embodiment, the phosphate solubilizing microorganism is a spore forming microorganism.

Non-limiting examples of phosphate solubilizing microorganisms include species from a genus selected from the group consisting of *Acinetobacter, Arthrobacter, Arthrobotrys, Aspergillus, Azospirillum, Bacillus, Burkholderia, Candida Chryseomonas, Enterobacter, Eupenicillium, Exiguobacterium, Klebsiella, Kluyvera, Microbacterium, Mucor, Paecilomyces, Paenibacillus, Penicillium, Pseudomonas, Serratia, Stenotrophomonas, Streptomyces, Streptosporangium, Swaminathania, Thiobacillus, Torulospora, Vibrio, Xanthobacter*, and *Xanthomonas*.

Non-limiting examples of phosphate solubilizing microorganisms are selected from the group consisting *Acinetobacter calcoaceticus, Acinetobacter* sp*., Arthrobacter* sp*., Arthrobotrys oligospora, Aspergillus niger, Aspergillus* sp*., Azospirillum halopraeferans, Bacillus amyloliquefaciens, Bacillus atrophaeus, Bacillus circulans, Bacillus licheniformis, Bacillus subtilis, Burkholderia cepacia, Burkholderia vietnamiensis, Candida krissii, Chryseomonas luteola, Enterobacter aerogenes, Enterobacter asburiae, Enterobacter* sp*., Enterobacter taylorae, Eupenicillium parvum, Exiguobacterium* sp*., Klebsiella* sp*., Kluyvera cryocrescens, Microbacterium* sp*., Mucor ramosissimus, Paecilomyces hepialid, Paecilomyces marquandii, Paenibacillus macerans, Paenibacillus mucilaginosus, Pantoea aglomerans, Penicillium expansum, Pseudomonas corrugate, Pseudomonas fluorescens, Pseudomonas lutea, Pseudomonas poae, Pseudomonas putida, Pseudomonas stutzeri, Pseudomonas*

*trivialis, Serratia marcescens, Stenotrophomonas maltophilia, Streptomyces* sp., *Streptosporangium* sp., *Swaminathania salitolerans, Thiobacillus ferrooxidans, Torulospora globosa, Vibrio proteolyticus, Xanthobacter agilis,* and *Xanthomonas campestris*.

In a particular embodiment, the phosphate solubilizing microorganism is a strain of the fungus *Penicillium*. Strains of the fungus *Penicillium* that may be useful in the practice of the present invention include *P. bilaiae* (formerly known as *P. bilaii*), *P. albidum, P. aurantiogriseum, P. chrysogenum, P. citreonigrum, P. citrinum, P. digitatum, P. frequentas, P. fuscum, P. gaestrivorus, P. glabrum, P. griseofulvum, P. implicatum, P. janthinellum, P. lilacinum, P. minioluteum, P. montanense, P. nigricans, P. oxalicum, P. pinetorum, P. pinophilum, P. purpurogenum, P. radicans, P. radicum, P. raistrickii, P. rugulosum, P. simplicissimum, P. solitum, P. variabile, P. velutinum, P. viridicatum, P. glaucum, P. fussiporus,* and *P. expansum*.

In one particular embodiment the *Penicillium* species is *P. bilaiae*. In another particular embodiment the *P. bilaiae* strains are selected from the group consisting of ATCC 20851, NRRL 50169, ATCC 22348, ATCC 18309, NRRL 50162 (Wakelin, et al., 2004. Biol Fertil Soils 40:36-43). In another particular embodiment the *Penicillium* species is *P. gaestrivorus*, e.g., NRRL 50170 (see, Wakelin, supra.).

In some embodiments, more than one phosphate solubilizing microorganism is used, such as, at least two, at least three, at least four, at least five, at least 6, including any combination of the *Acinetobacter, Arthrobacter, Arthrobotrys, Aspergillus, Azospirillum, Bacillus, Burkholderia, Candida Chryseomonas, Enterobacter, Eupenicillium, Exiguobacterium, Klebsiella, Kluyvera, Microbacterium, Mucor, Paecilomyces, Paenibacillus, Penicillium, Pseudomonas, Serratia, Stenotrophomonas, Streptomyces, Streptosporangium, Swaminathania, Thiobacillus, Torulospora, Vibrio, Xanthobacter,* and *Xanthomonas*, including one species selected from the following group: *Acinetobacter calcoaceticus, Acinetobacter sp, Arthrobacter* sp., *Arthrobotrys oligospora, Aspergillus niger, Aspergillus* sp., *Azospirillum halopraeferans, Bacillus amyloliquefaciens, Bacillus atrophaeus, Bacillus circulans, Bacillus licheniformis, Bacillus subtilis, Burkholderia cepacia, Burkholderia vietnamiensis, Candida krissii, Chryseomonas luteola, Enterobacter aerogenes, Enterobacter asburiae, Enterobacter* sp., *Enterobacter taylorae, Eupenicillium parvum, Exiguobacterium* sp., *Klebsiella* sp., *Kluyvera cryocrescens, Microbacterium* sp., *Mucor ramosissimus, Paecilomyces hepialid, Paecilomyces marquandii, Paenibacillus macerans, Paenibacillus mucilaginosus, Pantoea aglomerans, Penicillium expansum, Pseudomonas corrugate, Pseudomonas fluorescens, Pseudomonas lutea, Pseudomonas poae, Pseudomonas putida, Pseudomonas stutzeri, Pseudomonas trivialis, Serratia marcescens, Stenotrophomonas maltophilia, Streptomyces* sp., *Streptosporangium* sp., *Swaminathania salitolerans, Thiobacillus ferrooxidans, Torulospora globosa, Vibrio proteolyticus, Xanthobacter agilis,* and *Xanthomonas campestris*.

In some embodiments, two different strains of the same species may also be combined, for example, at least two different strains of *Penicillium* are used. The use of a combination of at least two different *Penicillium* strains has the following advantages. When applied to soil already containing insoluble (or sparingly soluble) phosphates, the use of the combined fungal strains will result in an increase in the amount of phosphorus available for plant uptake compared to the use of only one *Penicillium* strain. This in turn may result in an increase in phosphate uptake and/or an increase in yield of plants grown in the soil compared to use of individual strains alone. The combination of strains also enables insoluble rock phosphates to be used as an effective fertilizer for soils which have inadequate amounts of available phosphorus. Thus, in some embodiments, one strain of *P. bilaiae* and one strain of *P. gaestrivorus* are used. In other embodiments, the two strains are NRRL 50169 and NRRL 50162. In further embodiments, the at least two strains are NRRL 50169 and NRRL 50170. In yet further embodiments, the at least two strains are NRRL 50162 and NRRL 50170.

The phosphate solubilizing microorganisms may be prepared using any suitable method known to the person skilled in the art, such as, solid state or liquid fermentation using a suitable carbon source. The phosphate solubilizing microorganism is preferably prepared in the form of a stable spore.

In an embodiment, the phosphate solubilizing microorganism is a *Penicillium* fungus. The *Penicillium* fungus according to the invention can be grown using solid state or liquid fermentation and a suitable carbon source. *Penicillium* isolates may be grown using any suitable method known to the person skilled in the art. For example, the fungus may be cultured on a solid growth medium such as potato dextrose agar or malt extract agar, or in flasks containing suitable liquid media such as Czapek-Dox medium or potato dextrose broth. These culture methods may be used in the preparation of an inoculum of *Penicillium* spp. for treating (e.g., coating) seeds and/or application to an agronomically acceptable carrier to be applied to soil. The term "inoculum" as used in this specification is intended to mean any form of phosphate solubilizing microorganism (fungal cells, mycelium or fungal spores, bacterial cells or bacterial spores), which is capable of propagating on or in the soil when the conditions of temperature, moisture, etc., are favorable for fungal growth.

Solid state production of *Penicillium* spores, for example, may be achieved by inoculating a solid medium such as a peat or vermiculite-based substrate, or grains including, but not limited to, oats, wheat, barley, or rice. The sterilized medium (achieved through autoclaving or irradiation) is inoculated with a spore suspension ($1 \times 10^2$-$1 \times 10^7$ cfu/ml) of the appropriate *Penicillium* spp. and the moisture adjusted to 20 to 50%, depending on the substrate. The material is incubated for 2 to 8 weeks at room temperature. The spores may also be produced by liquid fermentation (Cunningham et al., 1990. Can J Bot. 68:2270-2274). Liquid production may be achieved by cultivating the fungus in any suitable media, such as potato dextrose broth or sucrose yeast extract media, under appropriate pH and temperature conditions that may be determined in accordance with standard procedures in the art.

The resulting material may be used directly, or the spores may be harvested, concentrated by centrifugation, formulated, and then dried using air drying, freeze drying, or fluid bed drying techniques (Friesen, et al., 2005, Appl Microbiol Biotechnol 68:397-404) to produce a wettable powder. The wettable powder is then suspended in water, applied to the surface of seeds, and allowed to dry prior to planting. The wettable powder may be used in conjunction with other seed treatments, such as, but not limited to, chemical seed treatments, carriers (e.g., talc, clay, kaolin, silica gel, kaolinite) or polymers (e.g., methylcellulose, polyvinylpyrrolidone). Alternatively, a spore suspension of the appropriate *Penicillium* spp. may be applied to a suitable soil-compatible carrier (e.g., peat-based powder or granule) to appropriate final moisture content. The material may be incubated at room temperature, typically for about 1 day to about 8 weeks, prior to use.

Aside from the ingredients used to cultivate the phosphate solubilizing microorganism, including, e.g., ingredients referenced above in the cultivation of *Penicillium*, the phosphate solubilizing microorganism may be formulated using other agronomically acceptable carriers. As used herein in connection with "carrier", the term "agronomically acceptable" refers to any material which can be used to deliver the actives to a seed, soil or plant, and preferably which carrier can be added (to the seed, soil or plant) without having an adverse effect on plant growth, soil structure, soil drainage or the like. Suitable carriers comprise, but are not limited to, wheat chaff, bran, ground wheat straw, peat-based powders or granules, gypsum-based granules, and clays (e.g., kaolin, bentonite, montmorillonite). When spores are added to the soil a granular formulation will be preferable. Formulations as liquid, peat, or wettable powder will be suitable for coating of seeds. When used to coat seeds, the material can be mixed with water, applied to the seeds and allowed to dry. Example of yet other carriers include moistened bran, dried, sieved and applied to seeds prior coated with an adhesive, e.g., gum arabic. In embodiments that entail formulation of the actives in a single composition, the agronomically acceptable carrier may be aqueous.

The amount of the at least one phosphate solubilizing microorganism is effective to enhance growth such that upon harvesting the plant exhibits at least one of increased plant yield measured in terms of bushels/acre, increased root number, increased root length, increased root mass, increased root volume and increased leaf area, compared to untreated plants or plants harvested from untreated seed (with either active). The suitable application rates vary according to the type of seed or soil, the type of crop plants, the amounts of the source of phosphorus and/or micronutrients present in the soil or added thereto, etc. A suitable rate can be found by simple trial and error experiments for each particular case. Normally, for *Penicillium*, for example, the application rate falls into the range of 0.001-1.0 Kg fungal spores and mycelium (fresh weight) per hectare, or $10^2$-$10^6$ colony forming units (cfu) per seed (when coated seeds are used), or on a granular carrier applying between $1\times10^6$ and $1\times10^{11}$ colony forming units per hectare. The fungal cells in the form of e.g., spores and the carrier can be added to a seed row of the soil at the root level or can be used to coat seeds prior to planting, as described in more detail below.

In embodiments, for example, that entail use of at least two strains of a phosphate solubilizing microorganism, such as, two strains of *Penicillium*, commercial fertilizers may be added to the soil instead of (or even as well as) natural rock phosphate. The source of phosphorous may contain a source of phosphorous native to the soil. In other embodiments, the source of phosphorous may be added to the soil. In one embodiment the source is rock phosphate. In another embodiment the source is a manufactured fertilizer. Commercially available manufactured phosphate fertilizers are of many types. Some common ones are those containing monoammonium phosphate (MAP), triple super phosphate (TSP), diammonium phosphate, ordinary superphosphate and ammonium polyphosphate. All of these fertilizers are produced by chemical processing of insoluble natural rock phosphates in large scale fertilizer-manufacturing facilities and the product is expensive. By means of the present invention it is possible to reduce the amount of these fertilizers applied to the soil while still maintaining the same amount of phosphorus uptake from the soil.

In a further embodiment, the source or phosphorus is organic. An organic fertilizer refers to a soil amendment derived from natural sources that guarantees, at least, the minimum percentages of nitrogen, phosphate, and potash. Examples include plant and animal by-products, rock powders, seaweed, inoculants, and conditioners. Specific representative examples include bone meal, meat meal, animal manure, compost, sewage sludge, or guano.

Other fertilizers, such as nitrogen sources, or other soil amendments may of course also be added to the soil at approximately the same time as the phosphate solubilizing microorganism or at other times, so long as the other materials are not toxic to the fungus.

Lipo-chitooligosaccharide compounds (LCO's), also known in the art as symbiotic Nod signals or Nod factors, consist of an oligosaccharide backbone of β-1,4-linked N-acetyl-D-glucosamine ("GlcNAc") residues with an N-linked fatty acyl chain condensed at the non-reducing end. LCO's differ in the number of GlcNAc residues in the backbone, in the length and degree of saturation of the fatty acyl chain, and in the substitutions of reducing and non-reducing sugar residues. An example of an LCO is presented below as formula I:

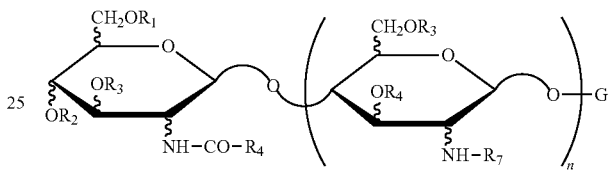

in which:
G is a hexosamine which can be substituted, for example, by an acetyl group on the nitrogen, a sulfate group, an acetyl group and/or an ether group on an oxygen,
$R_1$, $R_2$, $R_3$, $R_5$, $R_6$ and $R_7$, which may be identical or different, represent H, $CH_3$ CO—, $C_x H_y$ CO— where x is an integer between 0 and 17, and y is an integer between 1 and 35, or any other acyl group such as for example a carbamyl,
$R_4$ represents a mono-, di- or triunsaturated aliphatic chain containing at least 12 carbon atoms, and n is an integer between 1 and 4.

LCOs may be obtained (isolated and/or purified) from bacteria such as Rhizobia, e.g., *Rhizobium* sp., *Bradyrhizobium* sp., *Sinorhizobium* sp. and *Azorhizobium* sp. LCO structure is characteristic for each such bacterial species, and each strain may produce multiple LCO's with different structures. For example, specific LCOs from *S. meliloti* have also been described in U.S. Pat. No. 5,549,718 as having the formula II:

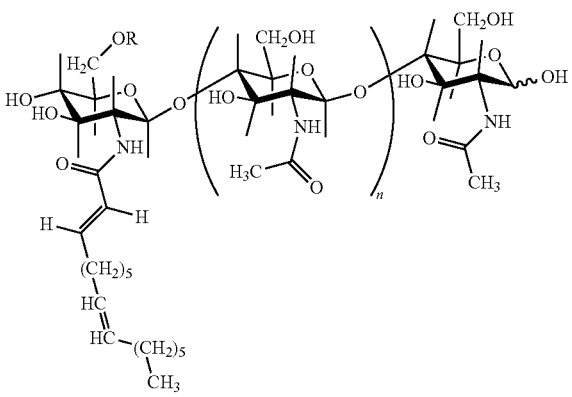

in which R represents H or $CH_3$ CO— and n is equal to 2 or 3.

Even more specific LCOs include NodRM, NodRM-1, NodRM-3. When acetylated (the R=$CH_3$ CO—), they become AcNodRM-1, and AcNodRM-3, respectively (U.S. Pat. No. 5,545,718).

LCOs from *Bradyrhizobium japonicum* are described in U.S. Pat. Nos. 5,175,149 and 5,321,011. Broadly, they are pentasaccharide phytohormones comprising methylfucose. A number of these *B. japonicum*-derived LCOs are described: BjNod-V ($C_{18:0}$); BjNod-V ($A_C$, $C_{18:1}$), BjNod-V ($C_{16:1}$); and BjNod-V ($A_C$, $C_{16:0}$), with "V" indicating the presence of five N-acetylglucosamines; "Ac" an acetylation; the number following the "C" indicating the number of carbons in the fatty acid side chain; and the number following the ":" the number of double bonds.

LCO's used in embodiments of the invention may be obtained (i.e., isolated and/or purified) from bacterial strains that produce LCO's, such as strains of *Azorhizobium*, *Bradyrhizobium* (including *B. japonicum*), *Mesorhizobium*, *Rhizobium* (including *R. leguminosarum*), *Sinorhizobium* (including *S. meliloti*), and bacterial strains genetically engineered to produce LCO's.

LCO's are the primary determinants of host specificity in legume symbiosis (Diaz, et al., Mol. Plant-Microbe Interactions 13:268-276 (2000)). Thus, within the legume family, specific genera and species of rhizobia develop a symbiotic nitrogen-fixing relationship with a specific legume host. These plant-host/bacteria combinations are described in Hungria, et al., Soil Biol. Biochem. 29:819-830 (1997), Examples of these bacteria/legume symbiotic partnerships include *S. meliloti*/alfalfa and sweet clover; *R. leguminosarum* biovar *viciae*/peas and lentils; *R. leguminosarum* biovar *phaseoli*/beans; *Bradyrhizobium japonicum*/soybeans; and *R. leguminosarum* biovar *trifolii*/red clover. Hungria also lists the effective flavonoid Nod gene inducers of the rhizobial species, and the specific LCO structures that are produced by the different rhizobial species. However, LCO specificity is only required to establish nodulation in legumes. In the practice of the present invention, use of a given LCO is not limited to treatment of seed of its symbiotic legume partner, in order to achieve increased plant yield measured in terms of bushels/acre, increased root number, increased root length, increased root mass, increased root volume and increased leaf area, compared to plants harvested from untreated seed, or compared to plants harvested from seed treated with the signal molecule just prior to or within a week or less of planting. Thus, by way of example, an LCO obtained from *B. japonicum* may be used to treat leguminous seed other than soybean and non-leguminous seed such as corn. As another example, the pea LCO obtainable from *R. leguminosarum* illustrated in FIG. 1 (designated LCO-V (C18:1), SP104) can be used to treat leguminous seed other than pea and non-legumes too.

Also encompassed by the present invention is use of LCOs obtained (i.e., isolated and/or purified) from a mycorrhizal fungi, such as fungi of the group Glomerocycota, e.g., *Glomus intraradicus*. The structures of representative LCOs obtained from these fungi are described in WO 2010/049751 and WO 2010/049751 (the LCOs described therein also referred to as "Myc factors").

Further encompassed by the present invention is use of synthetic LCO compounds, such as those described in WO 2005/063784, and recombinant LCO's produced through genetic engineering. The basic, naturally occurring LCO structure may contain modifications or substitutions found in naturally occurring LCO's, such as those described in Spaink, Crit. Rev. Plant Sci. 54:257-288 (2000) and D'Haeze, et al., Glycobiology 12:79R-105R (2002). Precursor oligosaccharide molecules (COs, which as described below, are also useful as plant signal molecules in the present invention) for the construction of LCOs may also be synthesized by genetically engineered organisms, e.g., as in Samain, et al., Carb. Res. 302:35-42 (1997); Samain, et al., J. Biotechnol. 72:33-47 (1999).

Figure 2:
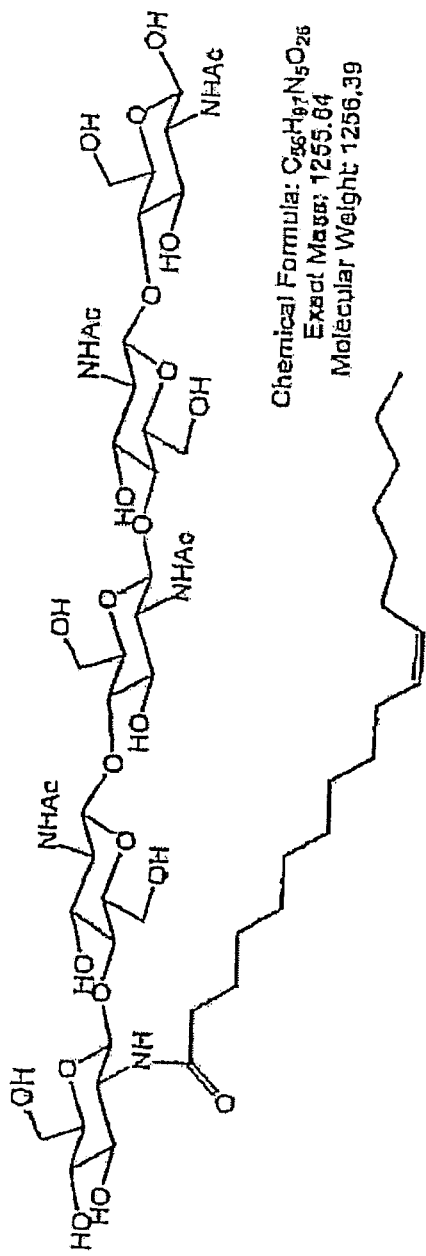

LCO's may be utilized in various forms of purity and may be used alone or in the form of a culture of LCO-producing bacteria or fungi. For example, OPTIMIZE® (commercially available from Novozymes BioAg Limited) contains a culture of *B. japonicum* that produces an LCO (LCO-V (C18:1, MeFuc), MOR116) that is illustrated in FIG. 2. Methods to provide substantially pure LCO's include simply removing the microbial cells from a mixture of LCOs and the microbe, or continuing to isolate and purify the LCO molecules through LCO solvent phase separation followed by HPLC chromatography as described, for example, in U.S. Pat. No. 5,549,718. Purification can be enhanced by repeated HPLC, and the purified LCO molecules can be freeze-dried for long-term storage.

Chitooligosaccharides (COs) as described above, may be used as starting materials for the production of synthetic LCOs. COs are known in the art as β-1-4 linked N actyl glucosamine structures identified as chitin oligomers, also as N-acetylchitooligosaccharides. CO's have unique and different side chain decorations which make them different from chitin molecules [$(C_8H_{13}NO_5)n$, CAS No. 1398-61-4], and chitosan molecules [$(C_5H_{11}NO_4)n$, CAS No. 9012-76-41. Representative literature describing the structure and production of COs is as follows: Van der Holst, et al., Current Opinion in Structural Biology, 11:608-616 (2001); Robina, et al., Tetrahedron 58:521-530 (2002); Hanel, et al., Planta 232:787-806 (2010); Rouge, et al. Chapter 27, "The Molecular Immunology of Complex Carbohydrates" in Advances in Experimental Medicine and Biology, Springer Science; Wan, et al., Plant Cell 21:1053-69 (2009); PCT/F100/00803 (Sep. 21, 2000); and Demont-Caulet, et al., Plant Physiol. 120(1):83-92 (1999). Two COs suitable for use in the present invention may be easily derived from the LCOs shown in FIGS. 1 and 2 (minus the fatty acid chains). The COs may be synthetic or recombinant. Methods for preparation of recombinant COs are known in the art. See, e.g., Samain, et al. (supra.); Cottaz, et al., Meth. Eng. 7(4):311-7 (2005) and Samain, et al., J. Biotechnol. 72:33-47 (1999).

The LCO and CO may be used alone, or in combination. Thus, in some embodiments, the present invention entails use of an LCO and a CO.

Seeds may be treated with the LCO and/or CO in several ways such as spraying or dripping. Spray and drip treatment may be conducted by formulating an effective amount of the LCO or CO in an agriculturally acceptable carrier, typically aqueous in nature, and spraying or dripping the composition onto seed via a continuous treating system (which is calibrated to apply treatment at a predefined rate in proportion to the continuous flow of seed), such as a drum-type of treater. These methods advantageously employ relatively small volumes of carrier so as to allow for relatively fast drying of the treated seed. In this fashion, large volumes of seed can be efficiently treated. Batch systems, in which a predetermined batch size of seed and signal molecule compositions are delivered into a mixer, may also be employed. Systems and apparatus for performing these processes are commercially available from numerous suppliers, e.g., Bayer CropScience (Gustafson).

In another embodiment, the treatment entails coating seeds. One such process involves coating the inside wall of a round container with the composition, adding seeds, then rotating the container to cause the seeds to contact the wall and the composition, a process known in the art as "container coating". Seeds can be coated by combinations of coating methods. Soaking typically entails use of an aqueous solution containing the plant growth enhancing agent. For example, seeds can be soaked for about 1 minute to about 24 hours (e.g., for at least 1 min, 5 min, 10 min, 20 min, 40 min, 80 min, 3 hr, 6 hr, 12 hr, 24 hr). Some types of seeds (e.g., soybean seeds) tend to be sensitive to moisture. Thus, soaking such seeds for an extended period of time may not be desirable, in which case the soaking is typically carried out for about 1 minute to about 20 minutes.

In those embodiments that entail storage of seed after application of the LCO or CO, adherence of the LCO or CO to the seed over any portion of time of the storage period is not critical. Without intending to be bound by any particular theory of operation, Applicants believe that even to the extent that the treating may not cause the plant signal molecule to remain in contact with the seed surface after treatment and during any part of storage, the LCO or CO may achieve its intended effect by a phenomenon known as seed memory or seed perception. See, Macchiavelli, et al., J. Exp. Bot. 55(408):1635-40 (2004). Applicants also believe that following treatment the LCO or CO, diffuses toward the young developing radicle and activates symbiotic and developmental genes which results in a change in the root architecture of the plant. Notwithstanding, to the extent desirable, the compositions containing the LCO or CO may further contain a sticking or coating agent. For aesthetic purposes, the compositions may further contain a coating polymer and/or a colorant.

The amount of the at least one LCO and/or at least one CO is effective to enhance growth such that upon harvesting the plant exhibits at least one of increased plant yield measured in terms of bushels/acre, increased root number, increased root length, increased root mass, increased root volume and increased leaf area, compared to untreated plants or plants harvested from untreated seed (with either active). The effective amount of the LCO or CO used to treat the seed, expressed in units of concentration, generally ranges from about $10^{-5}$ to about $10^{-14}$ M (molar concentration), and in some embodiments, from about $10^{-5}$ to about $10^{-11}$ M, and in some other embodiments from about $10^{-7}$ to about $10^{-8}$ M. Expressed in units of weight, the effective amount generally ranges from about 1 to about 400 μg/hundred weight (cwt) seed, and in some embodiments from about 2 to about 70 μg/cwt, and in some other embodiments, from about 2.5 to about 3.0 μg/cwt seed.

For purposes of treatment of seed indirectly, i.e., in-furrow treatment, the effective amount of the LCO or CO generally ranges from 1 μg/acre to about 70 μg/acre, and in some embodiments, from about 50 μg/acre to about 60 μg/acre. For purposes of application to the plants, the effective amount of the LCO or CO generally ranges from 1 μg/acre to about 30 μg/acre, and in some embodiments, from about 11 μg/acre to about 20 μg/acre.

Seed may be treated with the at least one phosphate solubilizing microorganism (e.g., *Penicillium*) and the at least LCO and/or at least one CO just prior to or at the time of planting. Treatment at the time of planting may include direct application to the seed as described above, or in some other embodiments, by introducing the actives into the soil, known in the art as in-furrow treatment. In those embodiments that entail treatment of seed followed by storage, the seed may be then packaged, e.g., in 50-lb or 100-lb bags, or bulk bags or containers, in accordance with standard techniques. The seed may be stored for at least 1, 2, 3, 4, 5, 6, 7, 8, 9, 10, 11, or 12 months, and even longer, e.g., 13, 14, 15, 16, 17, 18, 19, 20, 21, 22, 23, 24, 25, 26, 27, 28, 29, 30, 31, 32, 33, 34, 35, 36 months, or even longer, under appropriate storage conditions which are known in the art. Whereas soybean seed may have to be planted the following season, corn seed can be stored for much longer periods of time including upwards of 3 years.

The present invention may also include treatment of seed or plant with a plant signal molecule other than an LCO or CO. For purposes of the present invention, the term "plant signal molecule", which may be used interchangeably with "plant growth-enhancing agent" broadly refers to any agent, both naturally occurring in plants or microbes, and synthetic (and which may be non-naturally occurring) that directly or indirectly activates a plant biochemical pathway, resulting in increased plant growth, measureable at least in terms of at least one of increased yield measured in terms of bushels/acre, increased root number, increased root length, increased root mass, increased root volume and increased leaf area, compared to untreated plants or plants harvested from untreated seed. Representative examples of plant signal molecules that may be useful in the practice of the present invention include chitinous compounds (other than COs), flavonoids, jasmonic acid, linoleic acid and linolenic acid and their derivatives, and karrikins.

Chitins and chitosans, which are major components of the cell walls of fungi and the exoskeletons of insects and crustaceans, are also composed of GlcNAc residues. Chitinous compounds include chitin, (IUPAC: N-[5-[[3-acetylamino-4,5-dihydroxy-6-(hydroxymethyl)oxan-2yl]methoxymethyl]-2-[[5-acetylamino-4,6-dihydroxy-2-(hydroxy methyl)oxan-3-yl]methoxymethyl]-4-hydroxy-6-(hydroxymethyl)oxan-3-ys]ethanamide), and chitosan, (IUPAC: 5-amino-6-[5-amino-6-[5-amino-4,6-dihydroxy-2 (hydroxymethyl)oxan-3-yl]oxy-4-hydroxy-2-(hydroxymethyl)oxan-3-yl]oxy-2(hydroxymethyl)oxane-3,4-diol).
These compounds may be obtained commercially, e.g., from Sigma-Aldrich, or prepared from insects, crustacean shells, or fungal cell walls. Methods for the preparation of chitin and chitosan are known in the art, and have been described, for example, in U.S. Pat. No. 4,536,207 (preparation from crustacean shells), Pochanavanich, et al., Lett. Appl. Microbiol. 35:17-21 (2002) (preparation from fungal cell walls), and U.S. Pat. No. 5,965,545 (preparation from crab shells and hydrolysis of commercial chitosan). Deacetylated chitins and chitosans may be obtained that range from less than 35% to greater than 90% deacetylation, and cover a broad spectrum of molecular weights, e.g., low molecular weight chitosan oligomers of less than 15 kD and chitin oligomers of 0.5 to 2 kD; "practical grade" chitosan with a molecular weight of about 15 kD; and high molecular weight chitosan of up to 70 kD. Chitin and chitosan compositions formulated for seed treatment are also commercially available. Commercial products include, for example, ELEXA® (Plant Defense Boosters, Inc.) and BEYOND™ (Agrihouse, Inc.).

Flavonoids are phenolic compounds having the general structure of two aromatic rings connected by a three-carbon bridge. Flavonoids are produced by plants and have many functions, e.g., as beneficial signaling molecules, and as protection against insects, animals, fungi and bacteria. Classes of flavonoids include chalcones, anthocyanidins, coumarins, flavones, flavanols, flavonols, flavanones, and isoflavones. See, Jain, et al., J. Plant Biochem. & Biotechnol. 11:1-10 (2002); Shaw, et al., Environmental Microbiol. 11:1867-80 (2006).

Representative flavonoids that may be useful in the practice of the present invention include genistein, daidzein, formononetin, naringenin, hesperetin, luteolin, and apigenin. Flavonoid compounds are commercially available, e.g., from Natland International Corp., Research Triangle Park, NC; MP Biomedicals, Irvine, CA; LC Laboratories, Woburn MA. Flavonoid compounds may be isolated from plants or seeds, e.g., as described in U.S. Pat. Nos. 5,702,752; 5,990,291; and 6,146,668. Flavonoid compounds may also be produced by genetically engineered organisms, such as yeast, as described in Ralston, et al., Plant Physiology 137:1375-88 (2005).

Jasmonic acid (JA, [1R-[1α,2β(Z)]]-3-oxo-2-(pentenyl) cyclopentaneacetic acid) and its derivatives, linoleic acid ((Z,Z)-9,12-Octadecadienoic acid) and its derivatives, and linolenic acid ((Z,Z,Z)-9,12,15-octadecatrienoic acid) and its derivatives, may be used in the practice of the present invention. Jasmonic acid and its methyl ester, methyl jasmonate (MeJA), collectively known as jasmonates, are octadecanoid-based compounds that occur naturally in plants. Jasmonic acid is produced by the roots of wheat seedlings, and by fungal microorganisms such as *Botryodiplodia theobromae* and *Gibberella fujikuroi*, yeast (*Saccharomyces cerevisiae*), and pathogenic and non-pathogenic strains of *Escherichia coli*. Linoleic acid and linolenic acid are produced in the course of the biosynthesis of jasmonic acid. Jasmonates, linoleic acid and linoleic acid (and their derivatives) are reported to be inducers of nod gene expression or LCO production by rhizobacteria. See, e.g., Mabood, Fazli, Jasmonates induce the expression of nod genes in *Bradyrhizobium japonicum*, May 17, 2001; and Mabood, Fazli, "Linoleic and linolenic acid induce the expression of nod genes in *Bradyrhizobium japonicum*," USDA 3, May 17, 2001.

Useful derivatives of linoleic acid, linolenic acid, and jasmonic acid that may be useful in the practice of the present invention include esters, amides, glycosides and salts. Representative esters are compounds in which the carboxyl group of linoleic acid, linolenic acid, or jasmonic acid has been replaced with a —COR group, where R is an —OR$^1$ group, in which R$^1$ is: an alkyl group, such as a $C_1$-$C_8$ unbranched or branched alkyl group, e.g., a methyl, ethyl or propyl group; an alkenyl group, such as a $C_2$-$C_8$ unbranched or branched alkenyl group; an alkynyl group, such as a $C_2$-$C_8$ unbranched or branched alkynyl group; an aryl group having, for example, 6 to 10 carbon atoms; or a heteroaryl group having, for example, 4 to 9 carbon atoms, wherein the heteroatoms in the heteroaryl group can be, for example, N, O, P, or S. Representative amides are compounds in which the carboxyl group of linoleic acid, linolenic acid, or jasmonic acid has been replaced with a —COR group, where R is an NR$^2$R$^3$ group, in which R$^2$ and R$^3$ are independently: hydrogen; an alkyl group, such as a $C_1$-$C_8$ unbranched or branched alkyl group, e.g., a methyl, ethyl or propyl group; an alkenyl group, such as a $C_2$-$C_8$ unbranched or branched alkenyl group; an alkynyl group, such as a $C_2$-$C_8$ unbranched or branched alkynyl group; an aryl group having, for example, 6 to 10 carbon atoms; or a heteroaryl group having, for example, 4 to 9 carbon atoms, wherein the heteroatoms in the heteroaryl group can be, for example, N, O, P, or S. Esters may be prepared by known methods, such as acid-catalyzed nucleophilic addition, wherein the carboxylic acid is reacted with an alcohol in the presence of a catalytic amount of a mineral acid. Amides may also be prepared by known methods, such as by reacting the carboxylic acid with the appropriate amine in the presence of a coupling agent such as dicyclohexyl carbodiimide (DCC), under neutral conditions. Suitable salts of linoleic acid, linolenic acid, and jasmonic acid include e.g., base addition salts. The bases that may be used as reagents to prepare metabolically acceptable base salts of these compounds include those derived from cations such as alkali metal cations (e.g., potassium and sodium) and alkaline earth metal cations (e.g., calcium and magnesium). These salts may be readily prepared by mixing together a solution of linoleic acid, linolenic acid, or jasmonic acid with a solution of the base. The salt may be precipitated from solution and be collected by filtration or may be recovered by other means such as by evaporation of the solvent.

Karrikins are vinylogous 4H-pyrones e.g., 2H-furo[2,3-c]pyran-2-ones including derivatives and analogues thereof. Examples of these compounds are represented by the following structure:

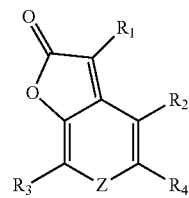

in which Z is O, S or NR$_5$; R$_1$, R$_2$, R$_3$, and R$_4$ are each independently H, alkyl, alkenyl, alkynyl, phenyl, benzyl, hydroxy, hydroxyalkyl, alkoxy, phenyloxy, benzyloxy, CN, COR$_6$, COOR=, halogen, NR$_6$R$_7$, or NO$_2$; and R$_5$, R$_6$, and R$_7$ are each independently H, alkyl or alkenyl, or a biologically acceptable salt thereof. Examples of biologically acceptable salts of these compounds may include acid addition salts formed with biologically acceptable acids, examples of which include hydrochloride, hydrobromide, sulphate or bisulphate, phosphate or hydrogen phosphate, acetate, benzoate, succinate, fumarate, maleate, lactate, citrate, tartrate, gluconate; methanesulphonate, benzenesulphonate and p-toluenesulphonic acid. Additional biologically acceptable metal salts may include alkali metal salts, with bases, examples of which include the sodium and potassium salts. Examples of compounds embraced by the structure and which may be suitable for use in the present invention include the following: 3-methyl-2H-furo[2,3-c]pyran-2-one (where R$_1$=CH$_3$, R$_2$, R$_3$, R$_4$=H), 2H-furo[2,3-c]pyran-2-one (where R$_1$, R$_2$, R$_3$, R4=H), 7-methyl-2H-furo[2,3-c]pyran-2-one (where R$_1$, R$_2$, R$_4$=H, R$_3$=CH$_3$), 5-methyl-2H-furo[2,3-c]pyran-2-one (where R$_1$, R$_2$, R$_3$=H, R$_4$=CH$_3$), 3,7-dimethyl-2H-furo[2,3-c]pyran-2-one (where R$_1$, R$_3$=CH$_3$, R$_2$, R$_4$=H), 3,5-dimethyl-2H-furo[2,3-c]pyran-2-one (where R$_1$, R$_4$=CH$_3$, R$_2$, R$_3$=H), 3,5,7-trimethyl-2H-furo[2,3-c]pyran-2-one (where R$_1$, R$_3$, R$_4$=CH$_3$, R$_2$=H), 5-methoxymethyl-3-methyl-2H-furo[2,3-c]pyran-2-one (where R$_1$=CH$_3$, R$_2$, R$_3$=H, R$_4$=CH$_2$OCH$_3$), 4-bromo-3,7-dimethyl-2H-furo[2,3-c]pyran-2-one (where R$_1$, R$_3$=CH$_3$, R$_2$=Br, R$_4$=H), 3-methylfuro[2,3-c]pyridin-2(3H)-one (where Z=NH, R$_1$=CH$_3$, R$_2$, R$_3$, R$_4$=H), 3,6-dimethylfuro[2,3-c]pyridin-2(6H)-one (where Z=N—CH$_3$, R$_1$=CH$_3$, R$_2$, R$_3$, R$_4$=H). See, U.S. Pat. No. 7,576,213. These molecules are also known as karrikins. See, Halford, supra.

The present invention may further include treatment of the seed or the plants that germinate from the seed with an agriculturally/agronomically beneficial agent. As used herein and in the art, the term "agriculturally or agronomically beneficial" refers to agents that when applied to seeds result in enhancement (which may be statistically significant) of plant characteristics such as plant stand, growth, vigor or yield in comparison to non-treated seeds. Representative examples of such agents that may be useful in the practice of the present invention include herbicides, fungicides and insecticides.

Suitable herbicides include bentazon, acifluorfen, chlorimuron, lactofen, clomazone, fluazifop, glufosinate, glyphosate, sethoxydim, imazethapyr, imazamox, fomesafe, flumiclorac, imazaquin, and clethodim. Commercial products containing each of these compounds are readily available. Herbicide concentration in the composition will generally correspond to the labeled use rate for a particular herbicide.

A "fungicide" as used herein and in the art, is an agent that kills or inhibits fungal growth. As used herein, a fungicide "exhibits activity against" a particular species of fungi if treatment with the fungicide results in killing or growth inhibition of a fungal population (e.g., in the soil) relative to an untreated population. Effective fungicides in accordance with the invention will suitably exhibit activity against a broad range of pathogens, including but not limited to *Phytophthora, Rhizoctonia, Fusarium, Pythium, Phomopsis* or *Selerotinia* and *Phakopsora* and combinations thereof.

Commercial fungicides may be suitable for use in the present invention. Suitable commercially available fungicides include PROTÉGÉ, RIVAL or ALLEGIANCE FL or LS (Gustafson, Plano, TX), WARDEN RTA (Agrilance, St. Paul, MN), APRON XL, APRON MAXX RTA or RFC, MAXIM 4FS or XL (Syngenta, Wilmington, DE), CAPTAN (Arvesta, Guelph, Ontario) and PROTREAT (Nitragin Argentina, Buenos Ares, Argentina). Active ingredients in these and other commercial fungicides include, but are not limited to, fludioxonil, mefenoxam, azoxystrobin and metalaxyl. Commercial fungicides are most suitably used in accordance with the manufacturer's instructions at the recommended concentrations.

As used herein, an insecticide "exhibits activity against" a particular species of insect if treatment with the insecticide results in killing or inhibition of an insect population relative to an untreated population. Effective insecticides in accordance with the invention will suitably exhibit activity against a broad range of insects including, but not limited to, wireworms, cutworms, grubs, corn rootworm, seed corn maggots, flea beetles, chinch bugs, aphids, leaf beetles, and stink bugs.

Commercial insecticides may be suitable for use in the present invention. Suitable commercially-available insecticides include CRUISER (Syngenta, Wilmington, DE), GAUCHO and PONCHO (Gustafson, Plano, TX). Active ingredients in these and other commercial insecticides include thiamethoxam, clothianidin, and imidacloprid. Commercial insecticides are most suitably used in accordance with the manufacturer's instructions at the recommended concentrations.

The methods of the present invention are applicable to leguminous seed, representative examples of which include soybean, alfalfa, peanut, pea, lentil, bean and clover. The methods of the present invention are also applicable to non-leguminous seed, e.g., Poaceae, Cucurbitaceae, Malvaceae. Asteraceae, Chenopodiaceae and Solonaceae. Representative examples of non-leguminous seed include field crops such as corn, rice, oat, rye, barley and wheat, cotton and canola, and vegetable crops such as potatoes, tomatoes, cucumbers, beets, lettuce and cantaloupe.

All patent and non-patent publications cited in this specification are indicative of the level of skill of those skilled in the art to which this invention pertains. All these publications are herein incorporated by reference to the same extent as if each individual publication or patent application were specifically and individually indicated to be incorporated by reference.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

That which is claimed:

1. A method comprising:
    a) applying at least one lipo-chitooligosaccharide and at least one strain of *Penicillium* to a plant seed, thereby producing a treated plant seed; and
    b) storing said treated plant seed for at least two months prior to planting said treated plant seed.

2. The method of claim 1, wherein said treated plant seed is stored for at least three months prior to planting said treated plant seed.

3. The method of claim 1, wherein said treated plant seed is stored for at least six months prior to planting said treated plant seed.

4. The method of claim 1, wherein said treated plant seed is stored for at least nine months prior to planting said treated plant seed.

5. The method of claim 1, wherein said treated plant seed is stored for at least twelve months prior to planting said treated plant seed.

6. The method of claim 1, wherein said treated plant seed is stored for at least eighteen months prior to planting said treated plant seed.

7. The method of claim 1, wherein said treated plant seed is stored for at least twenty-four months prior to planting said treated plant seed.

8. The method of claim 1, wherein said at least one lipo-chitooligosaccharide comprises an LCO represented by the structure:

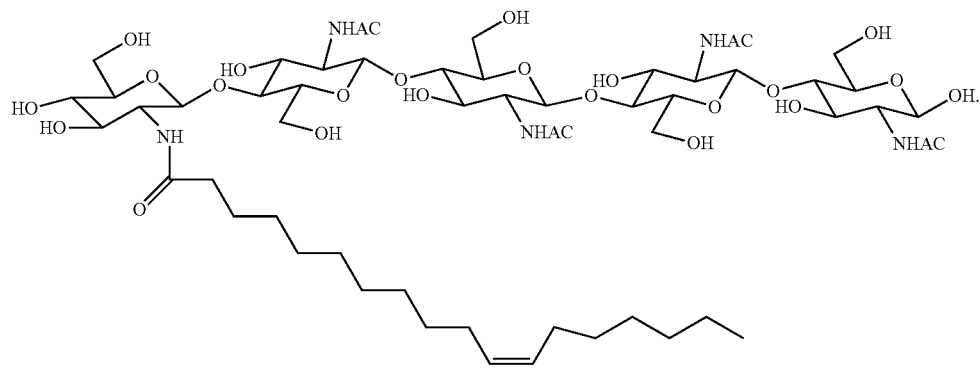

9. The method of claim 1, wherein said at least one lipo-chitooligosaccharide comprises an LCO represented by the structure:

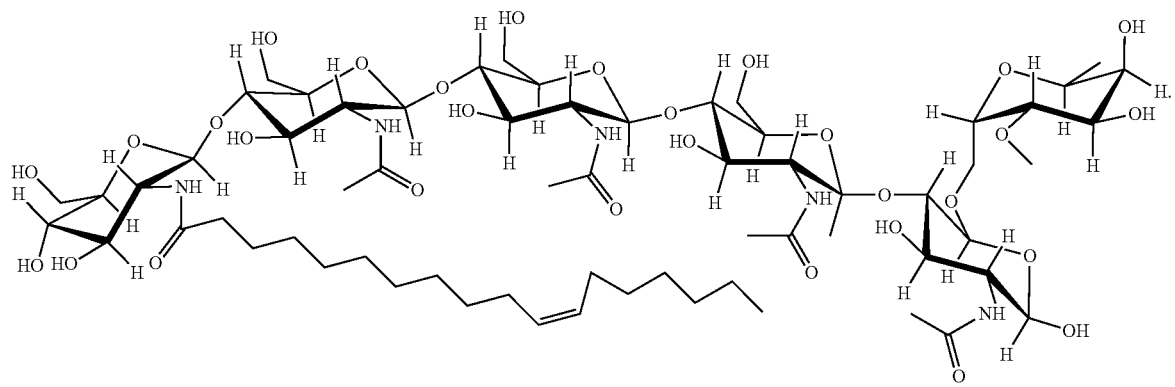

10. The method of claim 1, wherein said at least one lipo-chitooligosaccharide is applied to said plant seed at a concentration ranging from about $10^{-14}$ to about $10^{-5}$ M.

11. The method of claim 1, wherein said at least one strain of *Penicillium* comprises one or more strains of *Penicillium bilaiae*.

12. The method of claim 1, wherein said at least one strain of *Penicillium* comprises *Penicillium bilaiae* strain ATCC 20851, *Penicillium bilaiae* strain NRRL 50169, *Penicillium bilaiae* strain ATCC 22348, *Penicillium bilaiae* strain ATCC 18309, and/or *Penicillium bilaiae* strain NRRL B-50162.

13. The method of claim 1, wherein said at least one strain of *Penicillium* comprises at least two of *Penicillium bilaiae* strain ATCC 20851, *Penicillium bilaiae* strain NRRL 50169, *Penicillium bilaiae* strain ATCC 22348, *Penicillium bilaiae* strain ATCC 18309, and *Penicillium bilaiae* strain NRRL B-50162.

14. The method of claim 1, wherein said at least one strain of *Penicillium* comprises *Penicillium bilaiae* strain NRRL 50169 and *Penicillium bilaiae* strain NRRL B-50162.

15. The method of claim 1, wherein said at least one strain of *Penicillium* is applied to said plant seed at a rate of at least $1 \times 10^7$ colony forming units per gram of inoculant composition.

16. The method of claim 1, wherein said plant seed is a cereal seed.

17. The method of claim 1, wherein said plant seed is a corn seed.

18. The method of claim 1, wherein said plant seed is a wheat seed.

* * * * *